Oct. 22, 1968  R. E. WEISS ET AL  3,407,120
TISSUE CULTURE PROPAGATOR AND METHOD
Filed Dec. 23, 1965  3 Sheets-Sheet 1

Inventors:
Ronald E. Weiss and
Joseph B. Schleicher
By: Gildo E. Pato
Atty.

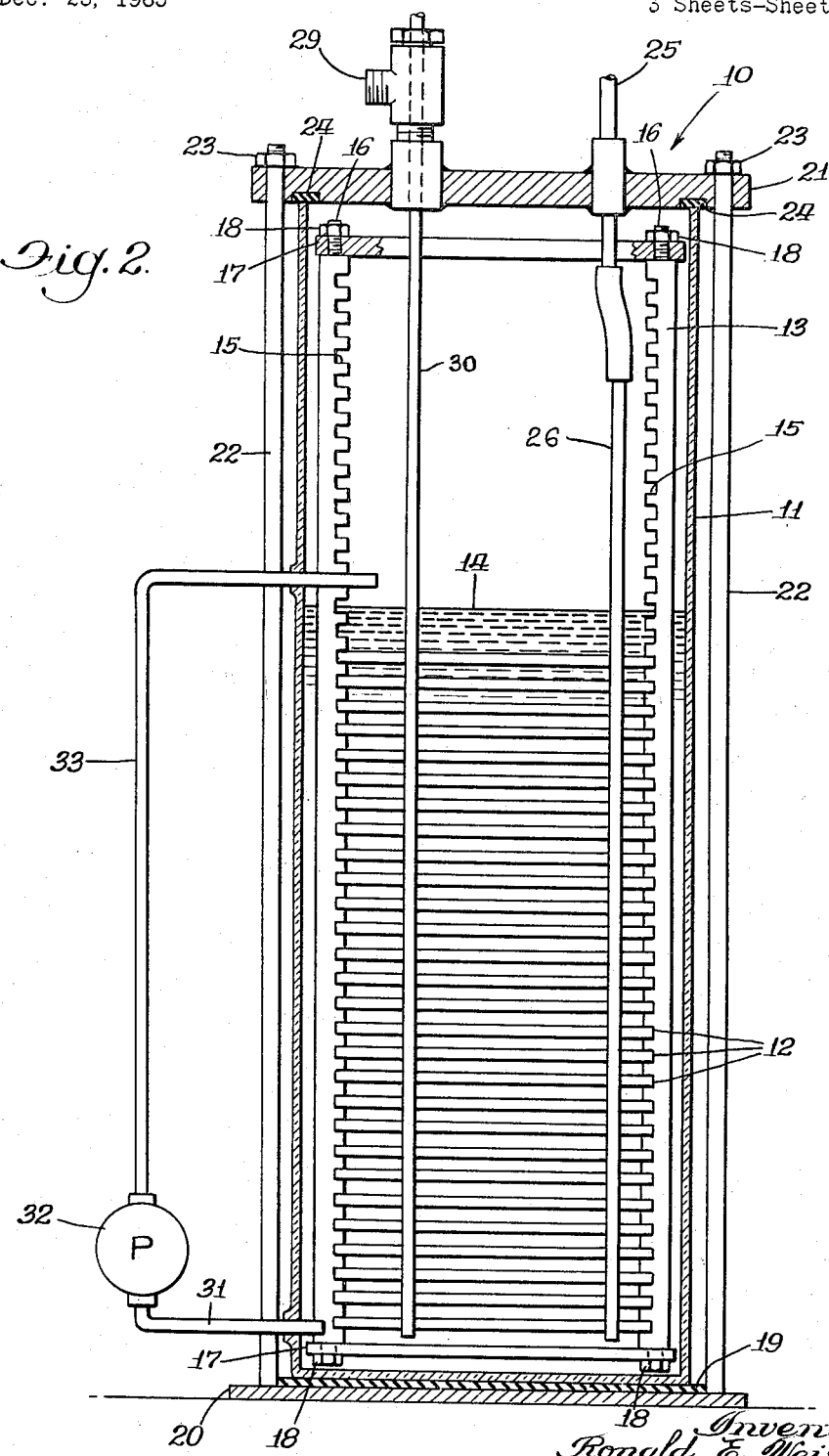

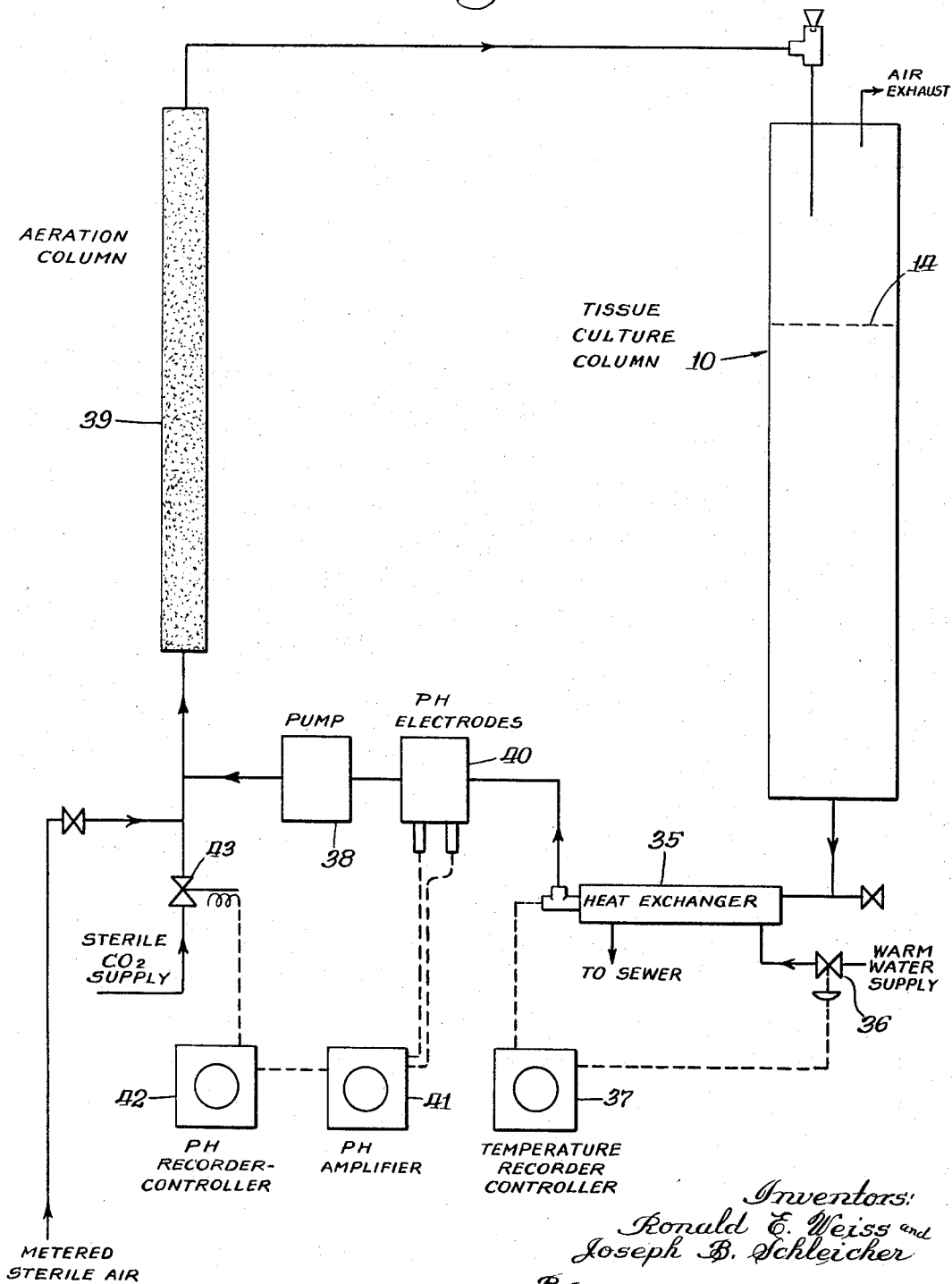

United States Patent Office 3,407,120
Patented Oct. 22, 1968

3,407,120
TISSUE CULTURE PROPAGATOR AND METHOD
Ronald E. Weiss, Grayslake, and Joseph B. Schleicher, Waukegan, Ill., assignors to Abbott Laboratories, Chicago, Ill., a corporation of Illinois
Filed Dec. 23, 1965, Ser. No. 515,915
8 Claims. (Cl. 195—104)

ABSTRACT OF THE DISCLOSURE

A method and apparatus for growing living cells, the apparatus comprising a plurality of spaced-apart plates upon which the cells may attach and proliferate and disposed within a vessel or tank-type container containing nutrient medium. Means for mixing and oxygenating of the medium are provided. Cells can be grown within the apparatus by planting the medium with cells desired to be grown and oxygenating and circulating the medium until a substantially confluent monolayer of cells is formed on the surface of the plates.

---

This invention relates to a method and apparatus for growing living cells, and in particular to a method and apparatus for growing tissue cultures on a large scale.

Present techniques and equipment for growing tissue cultures on surfaces are not adapted for large scale production, particularly in a single production unit. Large scale tissue culture propagation is desirable in view of the large quantities of living cells required in the development and production of vaccines or the large quantities of virus required for research studies. One tissue culture process for virus production for vaccines entails cell growth on the bottom surface of one-liter rectangular bottles. Sterilized tissue culture medium containing a suspension of cells is added to the bottles. The cells are then incubated until the cell growth forms a sheet on the submerged glass surface after which the cell growth medium is replaced with a fresh medium containing the virus. After the virus penetrates the cells and the virus concentration in the medium has attained a satisfactory level through the reproductive process, the medium containing the virus is processed to make vaccines. Tissue culture by this method requires cell growth on the surfaces of a large number of bottles in order to obtain significant amounts of tissue cultures.

The present invention provides a suitable apparatus for the large scale propagation of cells in tissue culture by the method of the invention. Such apparatus, briefly stated, comprises a plurality of spaced-apart plates or disks made of glass, plastic, or other suitable material upon which the cells may attach and proliferate. The plates are contained within a vessel or tank-type container. Means for mixing and oxygenation of the medium are provided as well as the attendant measuring and recording devices for control of proper growth conditions. The method of tissue culture cell growth employing such apparatus provides a closed, self-contained unit in which cell growth may be conducted in a uniform, controlled environment. A large surface area upon which cell growth can occur is provided in a small total occupied volume in comparison to the large total volume required for an equivalent cell growth surface area provided by a multitude of glass bottles or flasks.

Additionally, the tissue culture propagator of the present invention permits the utilization of an adjustable ratio of medium per cell sheet area; provides a self-contained unit which can be sterilized in place; provides means for separating the tissue culture cells from the fluid simply and easily; permits intermittent or continuous sampling of contents for analysis and control purposes; provides for in-place cleaning and reuse of the spaced plates; provides means for maintaining control of a uniform environment; minimizes the amount of labor per cell sheet area as compared to the handling of a multitude of glass bottles or flasks; and provides an automated system in comparison to prior art methods and apparatus.

The means of achieving the foregoing and other advantages of the present invention will be readily understood by reference to the following detailed description when considered in conjunction with the accompanying drawings, in which:

FIGURE 2 is an elevational view in cross-section of an apparatus employing a separate embodiment of the present invention;

FIGURE 3 is a schematical representation of an automatically controlled environment system.

Figure 1:
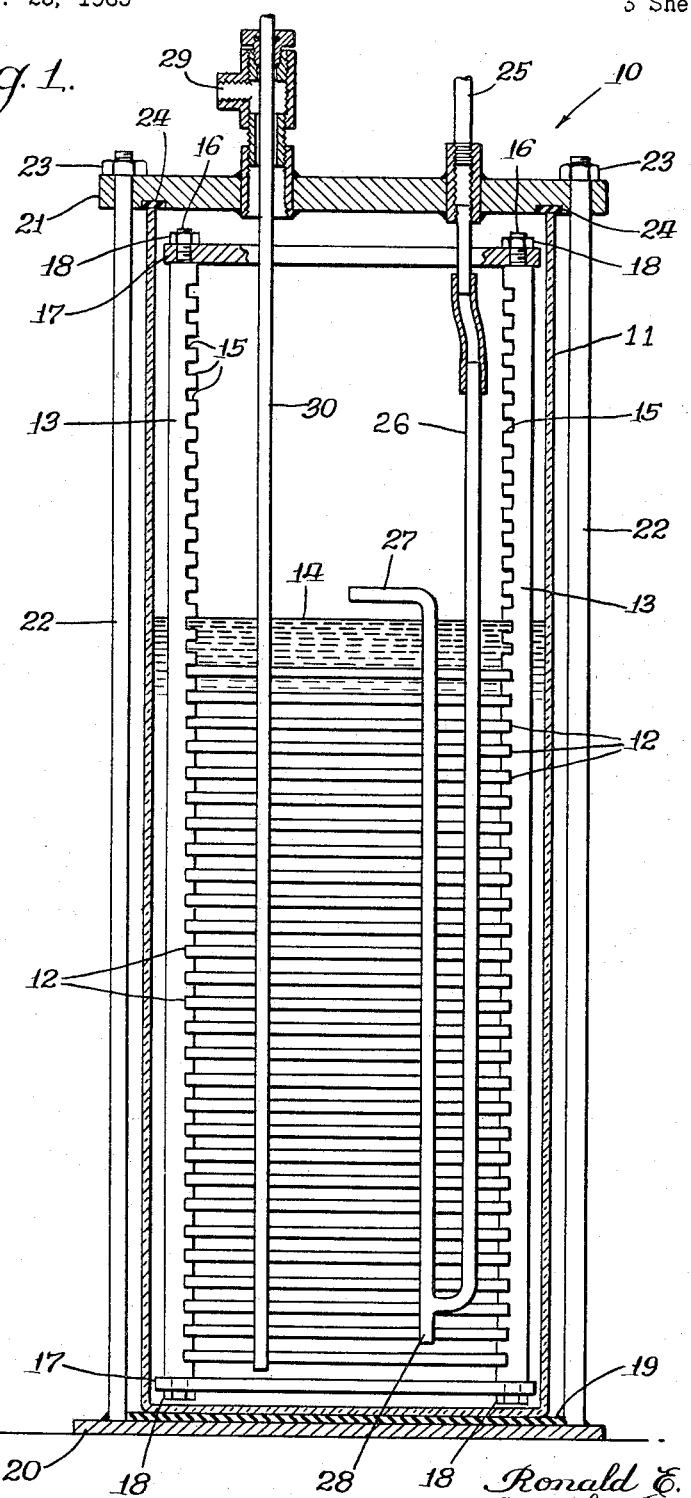
FIGURE 1 is an elevational view in cross-section of an apparatus embodying the present invention.

The improved apparatus 10 is represented in FIGURES 1 and 2. In the embodiment of the invention illustrated in FIGURE 1, a cylindrical vessel 11 is employed to house a plurality of stacked, spaced-apart plates 12 upon which the cells are grown. In the illustration, notched support rods 13 are used to support the plates 12 in a spaced-apart relationship. If desired, other means of supporting and separating the plates 12 may be employed; for example, several spacers of substantially equal thickness can be placed upon each plate to support the plates above it and to provide spacing between adjacent plates. The means employed to separate the plates 12 should permit free access and circulation of the growth medium 14 between the spaced plates 12. As illustrated, the support rods 13 have notches 15 therein into which are inserted the plates 12. The notches 15 are placed in the support rods 13 in a manner to provide the desired spacing between the plates 12. The support rods 13 are provided with threaded end portions 16 which are inserted through appropriate openings in the end plates 17. The entire assembly of plates 12, support rods 13, and end plates 17 are then clamped together by means of nuts 18.

The vessel 11 is placed on a resilient cushion 19 to provide protection for the vessel which is clamped between a base plate 20 and a cover plate 21. Clamping rods 22 are attached to the base plate 20, inserted through openings in the cover plate 21 and the assembly is then clamped together by means of nuts 23 threaded onto the ends of the clamping rods 22. A resilient annular gasket 24 is placed between the vessel 11 and the cover plate 21 so that when the assembly is clamped together, the vessel 11 is cushioned between the gasket 24 and the resilient cushion 19.

One of the disadvantages of prior art methods wherein the tissue culture is conducted in stoppered bottles is that the available oxygen in the tissue culture medium may limit the growth of the cells because of oxygen depletion or uncontrolled concentration gradients and pH variations caused by carbon dioxide accumulation. In use, the apparatus and methods of operating the present invention permit constant oxygen supply and mixing of the growth medium 14 to provide uniform growth conditions in and about all of the plurality of stacked, spaced-apart plates 12. In previous techniques, a large volume of gas phase was necessary to provide sufficient oxygen and to act as a reservoir for produced carbon dioxide. In the embodiment illustrated in FIGURE 1, a sterile air-$CO_2$ mixture is introduced through the inlet 25 of a sparge tube 26, the air being a source of oxygen and the $CO_2$ being used to control the pH. Other pH controlling agents may be employed in place of the $CO_2$. By permitting the gas mixture to flow from the bottom of the sparge tube 26, the free rising gas bubbles create a liquid turbulence which may disturb the cell growth on a portion of the area of the plates 12. To minimize this effect while at the same time providing a circulating means for the growth medium 14, an air lift pump 27 is employed. As the gas mixture enters the air lift pump 27, the rising gas bubbles draw liquid medium 14 through the bottom 28 of the pump 27 and carry it upward where it is discharged at the top of the air lift pump. In this manner, aeration of the medium 14 is maintained while at the same time the medium is gently circulated. A gas exhaust port 29 is provided to permit escape of exhausted gases and gaseous products. A sample tube 30, extending down into the liquid growth medium, is used to periodically extract samples of the medium for anlytical and control purposes.

As previously described, mixing and circulating of the growth medium 14 is necessary in order to provide a uniform growth environment about all of the stacked, spaced-apart plates 12. The mixing and circulating means may be an air lift pump, as previously described; an agitation system, which may be magnetic, vibrating, or may utilize a disk-type agitatior; or a mechanical pumping system may be employed. Illustrated in FIGURE 2 is a modification of the apparatus previously described and employing an external pumping system to effect mixing. Liquid medium 14 is drawn through an inlet conduit 31 positioned at the bottom of the tank 11 by a sterile pump 32 and is pumped through outlet conduit 33 to the top of the liquid medium where it is discharged. In this manner, the medium is circulated and aerated to provide uniform growth conditions throughout the vessel 11.

The assembled vessel 11 containing medium 14 therein together with a suitable medium circulating means may be placed in a constant temperature oven or controlled temperature bath to provide controlled temperature growth conditions. Alternately, a jacket may be provided on the vessel for containment of temperature controlling fluid. Likewise, the medium may be sampled intermittently or continuously in order to control the pH thereof. If desired, the medium can be monitored with a pH recorder which, in conjunction with a controller, can be employed to control the $CO_2$ supply and thereby control the pH of the medium.

There is illustrated schematically in FIGURE 3 a completely automatic system wherein the medium is circulated through a heat exchanger, aeration column, and the tissue culture column containing stacked, spaced-apart plates. Various measuring and controlling equipment are utilized to control and maintain proper growth conditions. As illustrated, the growth medium 14 within the tissue culture column 10 passes through suitable conduit into the heat exchanger 35, which, if desired, can be used for either heating or cooling of the growth medium. An automatically actuated valve 36 in conjunction with a temperature recorder-controller 37 and a warm water supply maintains the proper growth temperature. From the heat exchanger 35, the medium 14 is circulated through a pump 38 and into an aeration column 39. pH electrodes 40, inserted into the medium 14 which is circulated into the aeration column 39, measure the pH thereof and in conjunction with a pH amplifier 41, a pH recorder-controller 42 and an automatic valve 43 control the introduction of sterile $CO_2$ into the medium thereby controlling the pH thereof. Metered sterile air is introduced into the medium as it enters the aeration column 39 which may be packed with porcelain saddles or other suitable material for accomplishing gas-liquid contact.

The process of growing tissue which can be carried out with the apparatus described above is as follows. To begin the process, the apparatus is cleaned, assembled, and sterilized. Liquid nutrient medium and the desired cells for planting are then prepared. A quantity of nutrient liquid, sufficient to cover the plurality of plates and comprising suitable salt solutions, buffers, sera, pH indicators and antibiotics, is prepared. For most cells it is desirable to maintain the pH between 6.6 and 7.6. The cells for planting are obtained by a process of cell separation whereby individual cells are released from minced pieces of tissue. This may be done by the action of trypsin or other suitable enzyme or by other suitable systems which may be mechanical or chemical. The individual cells are washed in nutrient medium to remove or neutralize the proteolytic enzymes. The cells are then resuspended in the medium to the desired concentration for planting. The suspension is added to the mass tissue culture propagator aseptically by pump, vacuum, or gravity feed. The cells are then allowed to settle for a period sufficient to permit attachment to the surfaces of the plates. At that time aeration and circulation equipment is energized. With some cells, attachment of the cells to the surfaces of the plates is not necessary prior to circulation of the medium. Control of pH, dissolved oxygen and $CO_2$ is attained by controlling the rates of gassing and liquid circulation and by controlling the composition of the gas phase. The temperature is controlled by use of a jacketed vessel and an external heat transfer means, or by placing the tank in a constant temperature water bath or a constant temperature room. The growth of the cells on the plates is followed and monitored by the uptake of chemicals from the nutrient medium as well as by microscopic observations of suitable control vessels and/or one or more observation plates within the system. After a suitable predetermined time, a confluent monolayer of cells is attained on the surfaces of the plates. At this time the nutrient fluids are removed by pressure, vacuum, or gravity, and the tissue can be washed to remove traces of nutrient media or serum, and refilled with new medium, all under aseptic conditions. At this time the cells can be studied or used for vaccine production, biochemical production, nutritional observations, etc.

The invention is further illustrated by the following examples.

Example 1

Freshly-harvested young bovine kidneys are minced (2 mm.–5 mm.) and trypsinized using 0.25% trypsin solution.

The individual cells are suspended in nutrient medium comprising the following:

| | |
|---|---|
| Earl's balanced salt solution (National Cancer Inst. 4: 167, 1943) percent | 96 |
| Lactalbumin hydrolysate do | 0.5 |
| Calf serum do | 4.0 |
| Phenol red do | 0.01 |
| pH-adjusted with $CO_2$ pH | 6.6 |

The cells are resuspended to the desired concentration for planting ($1.8 \times 10^5$ cells per ml.) in the above medium. At this point, the medium is gassed with a mixture of sterile 5% $CO_2$ and 95% sterile air for several minutes for the purposes of attaining saturation of dissolved oxygen and adjustment of pH.

The cell suspension is pumped into the sterilized apparatus through the sample tube 30 as illustrated in FIGURE 1. The specific apparatus employed comprised a 7½ liter Pyrex glass vessel into which were arranged in a stacked, spaced-apart relationship, twenty-eight square glass plates (4" x 4"). The plates were separated by a distance of about ¼ inch. An air lift pump was used to circulate about 4½ liters of medium. The complete apparatus was assembled as previously described and as illustrated in FIGURE 1. The cell suspension is circulated by means of the air lift pump 27 for 10–15 minutes to insure good distribution of the cells. Then the air lift pump is stopped. The cells are allowed to settle onto the surfaces of the plates 12 for a period of approximately 4 hours. At this time the gas-air lift pump 27 is turned on to provide the gas mixture at a rate of 300 cc./min. and both gassing and circulation of the medium is started. The dissolved oxygen analysis of a sample taken at this time showed 50% of saturation as compared to water saturated with air at the same temperature. Gassing and circulation of the medium is continued throughout the growth cycle at a rate of 300 cc./min. to maintain dissolved oxygen at the desired level of 70%–90% of saturation. The temperature is maintained at 36°–37° C. by means of a constant temperature water bath in which the entire unit is held for 6–7 days.

Microscopic examination of the glass surfaces showed that the bovine kidney cells formed a confluent monolayer of normal cells equal to those grown in tissue culture bottles.

Example 2

Example 1 is repeated, except that after the cells are grown for 6–7 days, the growth medium is removed and replaced aseptically with medium 199 (Proc. Soc. Exp. Biol. Med., 73:1, 1950) for maintenance of the cells during virus production. A strain of young bovine kidney tissue culture adapted influenza B/M virus is introduced with the 199 maintenance medium. The air lift pump 27 is turned on immediately after the maintenance medium is added. From time to time during virus production, fluids are removed for assay. After a virus production phase of 6 days, the fluids are removed aseptically and assayed for dissolved oxygen and virus content. Final analysis showed:

```
                                          Per ml.
Hemagglutination titer _____ 16
Chick cell agglutination _____ 6.7
```

Example 3

Experiment 1 is repeated, except that instead of using young bovine kidney cells, Wistar cell strain W1–38 is used. The growth medium for these cells contained:

```
Basal medium (Eagle, H., Science 122: 501,
  1955) _____ percent__ 90
Calf serum _____ do____ 10
Glutamine _____ g./l__ 0.29
Phenol red _____ percent__ 0.01
```

The cell suspension was obtained from monolayers of cells grown in several tissue culture bottles. The cell suspension is added to the propagator as described in Example 1. Within 4 days the surfaces were observed microscopically and showed a confluent normal cell growth.

It will be understood that this invention is susceptible to modification in order to adapt it to different usages and conditions. It is desired to include such modifications within this invention provided they fall within the scope of the appended claims.

What is claimed is:

1. Apparatus for propagating tissue culture cells comprising: a vessel reservoir for liquid culture medium; a plurality of stacked, spaced-apart plates disposed within said vessel for providing surfaces to which the cell growth can attach; pH reading means and pH controlling agent introducing means for maintaining the pH of said liquid culture medium within a pre-selected pH range; circulating means for circulating the liquid culture medium within the system to maintain a uniform growth environment about all of the spaced-apart plates comprising outlet means disposed at the top of said vessel, inlet means disposed at the bottom of said vessel, and a pump positioned intermediate said outlet and inlet means and in communication therewith; and means for introducing an oxygen containing gas into said liquid culture medium.

2. The apparatus of claim 1 which includes a plurality of notched support rods to support and space the plates.

3. Apparatus for propagating tissue culture cells in an automatic system comprising: a vessel reservoir for liquid culture medium; a plurality of stacked spaced-apart plates disposed within said vessel for providing surfaces to which the cell growth can attach; means for introducing pH controlling agents into said liquid culture medium; pH recording and controlling means for activating said pH controlling agent introducing means in response to a predetermined pH indication to maintain the pH of said liquid culture medium within a preselected pH range; circulating means for circulating the liquid culture medium within the system to maintain a uniform growth environment about all of the spaced-apart plates; and means for introducing an oxygen-containing gas into said liquid culture medium.

4. The apparatus of claim 3 including temperature control means effective to maintain the temperature of the liquid culture medium within a preselected temperature range.

5. The apparatus of claim 3 including heating means for heating said liquid culture medium; and temperature recording and controlling means for activating said heating means in response to a predetermined temperature indication to maintain the temperature of said liquid culture medium within a preselected temperature range.

6. A method of growing tissue culture cells comprising the steps of: providing a reservoir vessel enclosing liquid culture medium and a plurality of stacked spaced-apart plates to provide a growth surface for the growing cells; planting the medium with tissue culture cells; oxygenating the liquid medium; circulating the liquid medium to maintain a uniform growth environment about all of the spaced-apart plates; and continuing the circulating and oxygenating until a substantially confluent monolayer of cells is formed on the surface of said plates.

7. A method of producing virus comprising the steps of: providing a reservoir vessel enclosing liquid culture medium and a plurality of stacked spaced-apart plates to provide a growth surface for growing tissue culture cells; planting the medium with said cells; oxygenating the liquid medium; circulating the liquid medium to maintain a uniform growth environment about all of the spaced-apart plates; continuing the oxygenating and circulating until a substantially confluent monolayer of cells is formed on the surface of said plates; removing the liquid medium; infecting the grown cells by adding selected virus with a fresh maintenance medium; oxygenating the maintenance medium; continuing the oxygenating of the maintenance medium until the desired concentration of virus is attained; and removing the maintenance medium for isolation and purification of the virus.

8. The method of claim 7 including the step of circulating the maintenance medium.

References Cited

UNITED STATES PATENTS 2,996,429  8/1961  Toulmin _____ 167—78
3,173,793  3/1965  Shore et al. _____ 195—143 X ALVIN E. TANENHOLTZ, *Primary Examiner.*